United States Patent [19]

Marchetti

[11] Patent Number: 4,843,496
[45] Date of Patent: Jun. 27, 1989

[54] TRACK-FINDING SERVOMECHANISM UTILIZING THE SAMPLED OUTPUT OF AN ENVELOPE COMPARISON

[75] Inventor: Jay D. Marchetti, Rochester, N.Y.

[73] Assignee: Eastman Kodak Company, Rochester, N.Y.

[21] Appl. No.: 924,541

[22] Filed: Oct. 29, 1986

[51] Int. Cl.$^4$ .............................................. G11D 5/596
[52] U.S. Cl. .............................. 360/77.06; 360/77.04
[58] Field of Search ...................................... 360/77, 78

[56] References Cited

U.S. PATENT DOCUMENTS

| | | | |
|---|---|---|---|
| 3,126,535 | 3/1964 | Streeter | 360/77 |
| 3,246,307 | 4/1966 | Stanley | 360/77 |
| 4,148,083 | 4/1979 | Watanabe | 360/77 |
| 4,197,564 | 4/1980 | Ravizza | 360/77 |
| 4,204,234 | 5/1980 | Noble | 360/77 |
| 4,229,773 | 10/1980 | Sakamoto | 360/77 |
| 4,318,142 | 3/1982 | Ravizza | 360/77 |
| 4,419,701 | 12/1983 | Harrison et al. | 360/77 |
| 4,443,823 | 4/1984 | Sakamoto | 360/77 |
| 4,445,153 | 4/1984 | Fujimoto et al. | 360/77 |
| 4,451,860 | 5/1984 | Honjo et al. | 360/77 |
| 4,462,053 | 7/1984 | Lum et al. | 360/77 |
| 4,485,418 | 11/1984 | Bremmer | 360/77 |
| 4,499,510 | 2/1985 | Harding et al. | 360/78 |
| 4,544,969 | 10/1985 | Painton | 360/77 |
| 4,563,713 | 1/1986 | Cahoon et al. | 360/77 |
| 4,608,613 | 8/1986 | Miyake | 360/78 |
| 4,677,506 | 6/1987 | Kaneko | 360/77 |

FOREIGN PATENT DOCUMENTS 0138202 4/1985 European Pat. Off. .

*Primary Examiner*—Alan Faber
*Assistant Examiner*—David L. Robertson
*Attorney, Agent, or Firm*—David M. Woods

[57] ABSTRACT

A servomechanism finds an optimum location for a transducer relative to a track on a magnetic disk by sampling signal strength for a plurality of transducer trajectories. By processing the amplitude envelope of the recorded signal through a comparator prior to sampling, the comparator output, rather than the continuous signal envelope, is sampled. In this way a manageable amount of data is produced for tabulating a collection of integers that specify the cross-track distribution of signal strength across the trajectories. The best trajectory is selected and the transducer is moved accordingly to obtain the best playback signal.

7 Claims, 6 Drawing Sheets

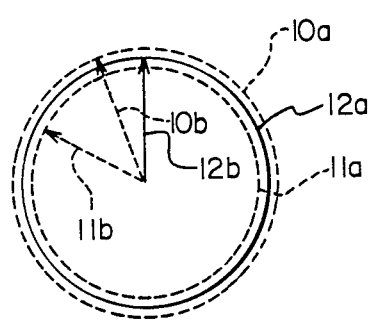
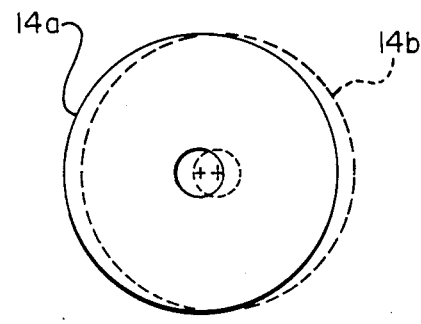
FIG. 1A          FIG. 1B
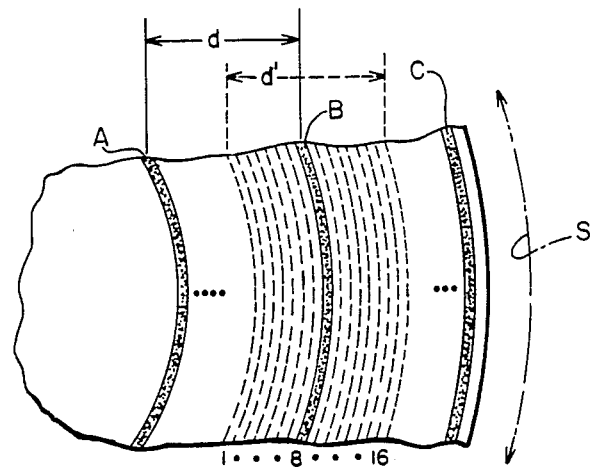
FIG. 3

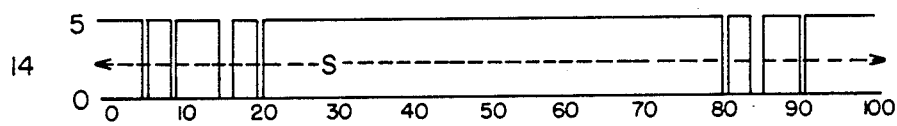
FIG. 5
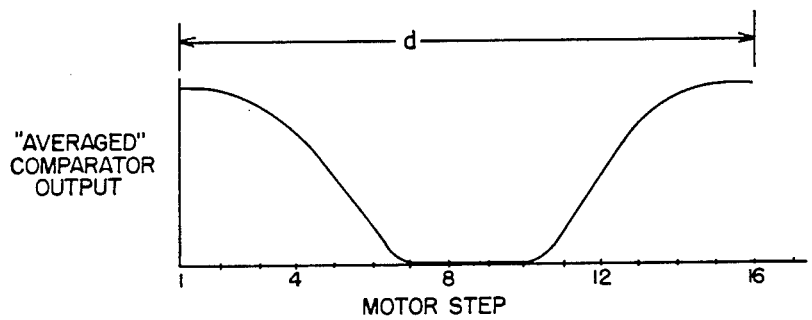
FIG. 6
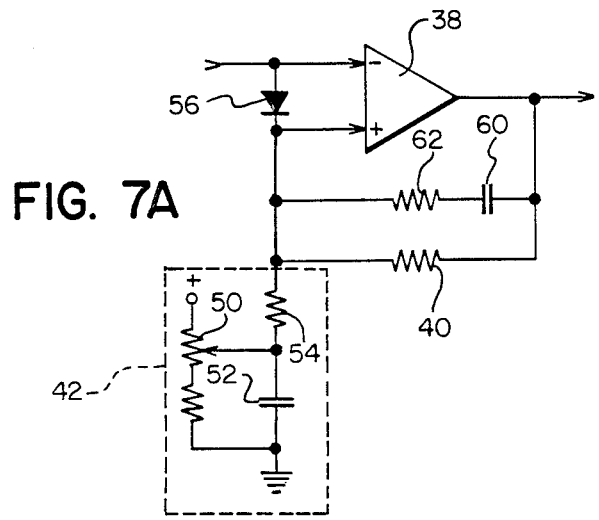
FIG. 7A
FIG. 7B
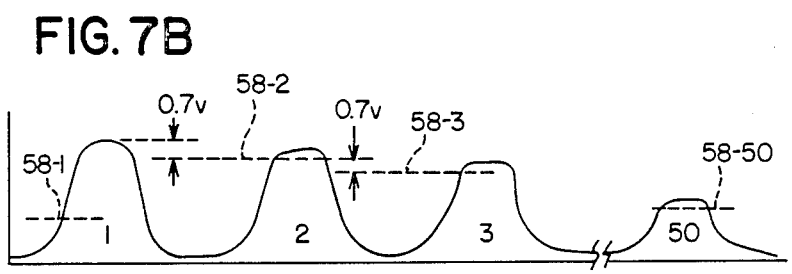

TRACK-FINDING SERVOMECHANISM UTILIZING THE SAMPLED OUTPUT OF AN ENVELOPE COMPARISON

BACKGROUND OF THE INVENTION

Field of the Invention

This invention relates to a magnetic recording and reproducing system and, in particular, to a servomechanism in a player for locating a magnetic head with respect to one or more prerecorded tracks on a rotary magnetic medium.

BRIEF DESCRIPTION OF THE DRAWINGS

The problem of track location and the invention will be described in relation to the following figures, in which:

FIGS. 1A and 1B respectively show the effects of ambient variations and mechanical eccentricity upon track location.

FIG. 3 relates to track locations to the trajectories of a magnetic transducer and to the increments of a stepping motor as shown in FIG. 2;

FIG. 5, which expands upon one of the signal strength profiles, is helpful in understanding FIG. 4;

FIG. 6 shows an example of the "averaged" output of the comparator of FIG. 2;

FIGS. 7A and 7B respectively show a circuit for setting a "floating" threshold for the comparator of FIG. 2 and a diagram helpful in understanding the reason for, and result of, such a threshold.

DESCRIPTION RELATIVE TO THE PRIOR ART

Figure 2:
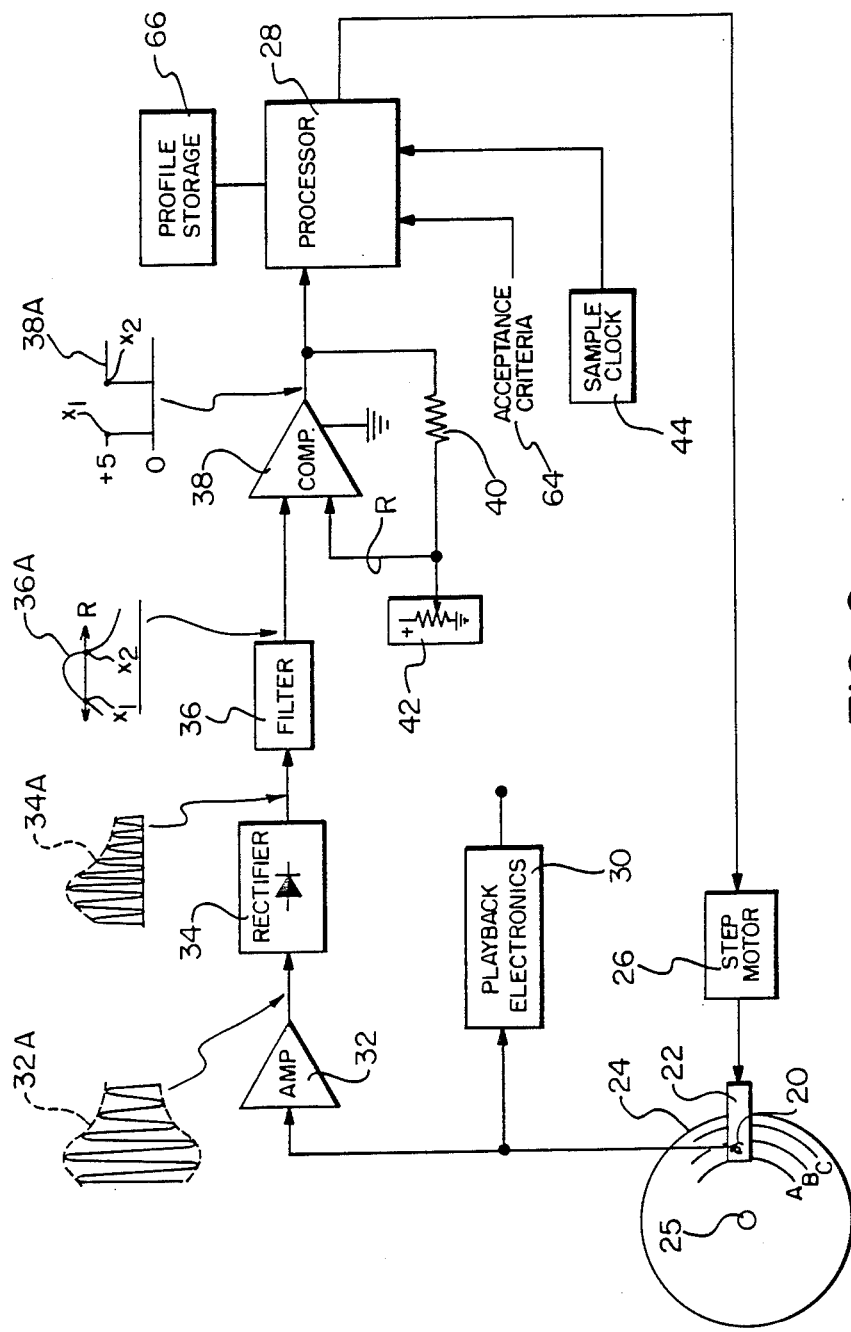
FIG. 2 shows a player incorporating a track-finding circuit according to the invention.

While this invention is useful in finding separated tracks on any rotary magnetic medium, it is particularly useful in finding closely spaced tracks prerecorded on a magnetic disk according to the standard of still video recording. This standard provides a format for recording up to fifty separate, concentric tracks on a small magnetic disk (47 millimeters in diameter). The radius of the innermost track is about 5 millimeters less than the radius of the outermost track. This allows a track-to-track spacing (i.e., track pitch) of 100 microns. Within the 100 microns spacing, 60 microns are allowed for the width of the track and 40 microns for a guard band between tracks.

While a magnetic track may be predictably located on a disk during the recording process, a number of post-recording events can affect the actual location of the track as seen by a later-used player. Two events are foremost, as follows. The expansion and contraction of the disk due to changes in relative humidity and temperature affects the radial position of prerecorded tracks. Such an effect is commonplace since it is very difficult to duplicate, upon playback, the ambient conditions present during recording. For the track dimensions used in connection with still video recording, such ambient variations may affect the track position by a substantial proportion of the track pitch. FIG. 1a shows the effect of a dimensional change for a disk having magnetic tracks recorded relative to the positions 10a and 11a (shown by broken line) having respective radii 10b and 11b. Changes in the relative humidity and temperature causes the media, and the track recorded in the position represented by 10a, for example, to "shrink" by half a track pitch. This is shown by the actual location 12a of the prerecorded track after the dimensional change. The "new" track has an effective radius 12b, a change of half a track pitch (the difference between radii 10b and 12b).

The other post-recording event concerns an eccentric movement caused by a minute mechanical misalignment of a disk in a player . . . relative to the recorder. Although the player (if it also records) may correctly follow a magnetic track just recorded upon the disk, once the disk is removed from the player and later reinserted, or worse yet, reinserted in another player, it is mechanically difficult to replicate the same transducer position relative to the prerecorded track. Even though the track may not have suffered the aforementioned dimensional variation, the trajectory of the transducer is often minutely off-centered with respective to the recorded track. This produce a trajectory that crosses over the prerecorded track in several locations, as shown in exaggerated form by FIG. 1B. The prerecorded track is represented by the solid line 14a and the misaligned trajectory of the transducer is represented by the broken line 14b.

Despite the aforementioned problems, it is necessary to repeatedly locate a playback transducer in operative association with a prerecorded track in order to produce an acceptable playback signal. A static servomechanism is a simple kind of servo that attempts to find the best position for the transducer and then leaves the transducer in that position while the disk rotates. Especially as shown by FIG. 1B, the "best" position is sometimes a trajectory that best approximates the center line of the prerecorded track. The problem thus comes down to a "best" fit to some predetermined criterion. European Patent application No. 138,202 (published Apr. 24, 1985) is exemplary of a known approach to finding the "best" position in which the envelope of the recorded signal is sampled in response to rotation of the recording medium. An envelope level is than calculated from the sample values. An optimum track location is determined by comparing the envelope level from one trajectory to the next until an optimum condition is met . . . a condition based on the comparison of the envelope levels with one or more reference levels.

The European application is representative of an "incremental" approach to obtaining a track location, that is, by gradually incrementing the transducer from one nearby trajectory to another until a particular transducer position is found that appears to give the best results in terms of a playback signal. There is, however, a major fault in this approach. By ending the track location process as soon as the first head trajectory seems acceptable, this approach tends to foreclose a complete evaluation of all transducer trajectories before a decision is taken. In effect, the signal-producing capability of a large portion of track-to-track space remains unknown and untested. The "best" position is estimated with less than all the available information. With a static servo, this situation is compounded in that there is no way to correct a bad decision.

SUMMARY OF THE INVENTION

Since the "best" location for a transducer can be seen as the trajectory that produces the "best" collection of acceptable numerical data about the recorded signal, the whole procedure can be viewed as a statistical process. For this to be successful, an adequate set of samples must be generated. Instead of rushing into a tracking decision, it is thus better to wait and collect enough information to calculate the distribution of signal strength for the transducer trajectories occupying at least a preponderance of the track-to-track space. It is then possible to obtain a meaningful cross-track description of signal strength from which a confident decision can be made about the best transducer location.

Since a statistical determination is ordinarily associated with a large quantity of data, it is important to simplify the problem of gathering a detailed profile of the signal strength in each of the trajectories. It has been found that by taking the reproduced signal through a comparator before sampling it is possible to simplify the collection of data to such an extent that a large amount of data may be collected over many transducer trajectories without overloading the player's control system. Also important, by collecting samples of the "binary" output of the comparator rather than samples of the continuous values of the recorded signal, a larger number of trajectories can be evaluated than heretofore suggested by "incremental" approaches without having to resort to the usual circuitry required for an analog/digital conversion.

The invention is based on statistically profiling, and storing, the signal strength of the recorded signal for a plurality of trajectories (in response to rotation of the medium). The best profile, and thus the best transducer trajectory, is selected. Apparatus for locating the magnetic transducer relative to a plurality of concentric magnetic tracks includes means for controlling the displacement of the transducer. The improvement according to the invention also encompasses the development of a cross-track distribution of signal strength for at least some of the incremental displacements of the transducer. Positioning is then effected relative to a trajectory having a profile providing an acceptable frequency of acceptable strength samples.

The statistical profile for each trajectory is developed by comparing the envelope of the recorded signal to a reference level. The output of the comparison is a "binary" signal that reflects excursions of the envelope amplitude above and below the reference level. It is the "binary" signal that is sampled and not the envelope signal. The collection of samples for a given head trajectory therefore represents a collection of "yes or no" decisions. It is possible to sum either of the two decisions as an indication of signal strength in a trajectory. Like sums are computed for each trajectory and together they form a cross-track integer description of the signal strength. The optimum head position is then determined by choosing a head trajectory having an integer value corresponding to a desirable signal strength. In a further embodiment, the comparator is an inverting comparator with hysteresis. The reference level provided to the comparator can also be a level that floats in accordance with the average signal strength, which is affected by the radial position of a track on a disk.

DETAILED DESCRIPTION OF THE PREFERRED EMBODIMENT

Because video players are well known, the present description will be directed in particular to elements forming part of, or cooperating more directly with, apparatus in accordance with the present invention. Elements not specifically shown or described herein may be selected from those known in the art.

Referring to FIG. 2, a magnetic transducer 20 is shown mounted to a movable plate 22 for cooperation with a set of tracks A, B and C (three of, e.g., fifty tracks) prerecorded on a magnetic disk 24. The magnetic disk 24 is mounted for rotation (on a conventional disk drive, not shown) about a rotational axis 25. As shown by FIG. 3, the tracks A, B and C are separated by a track pitch d, (which is equivalent to the cross-track distance d'). A stepping motor 26 controls the position of the movable plate 22, and therefore the position of the transducer 20, according to instructions from a processor 28. The incremental movement of the transducer 20 from track to track constitutes, for example, 16 individual steps of the motor 26. (As shown in FIG. 3, the steps are numbered 1-16). Each individual step constitutes one particular trajectory that the transducer 20 may trace with respect to the magnetic disk 24.

The signal reproduced by the transducer 20 in response to the rotation of the disk 24 is, according to still video practice, a frequency-modulated signal. It is provided to a playback electronic circuit 30. Apart from the fact that the object of the invention is to provide an acceptable playback signal, the playback circuit itself provides no part of the invention and will not be further described. The signal from the playback transducer 20 is also provided to a track-finding circuit, as follows. An amplifier 32 amplifies the reproduced signal and provides the amplified signal to a rectifier 34. The amplitude envelope of the reproduced (fm) signal depends in large part upon the trajectory of the playback transducer relative to the center-line of the recorded track. The center line in turn is affected by the aforementioned dimensional and eccentricity characteristics. As shown by the dotted line in waveform 32A, the amplitude envelope of the reproduced signal from a particular track can vary due to eccentric movement of the transducer relative to the track, or to a combination of eccentric movement and dimensional change. The output of the rectifier 34 is shown by the corresponding waveform 34A. The peaks of the reproduced signal form an amplitude envelope that is filtered from the reproduced signal by a conventional filter 36 and applied to the negative input terminal of a comparator 38.

The comparator 38, as shown in FIG. 2, is an inverting comparator with positive feedback through a resistor 40 to provide hysteresis. A reference level is set by an element 42, such as a variable resistor, connected to the positive input terminal of the comparator 38. As is well known, hysteresis will slightly vary the reference level depending on the state of the comparator output in order to reduce multiple transitions caused by noise. More particularly, the effect of the resistor 40 is to make the circuit have two thresholds, depending on the output state. The threshold when the output is at ground (input high) is slightly lower than when the output is high (input low). A noisy input is thus less likely to produce multiple triggering and oscillation. This type of comparator is also known as a Schmitt trigger. For simplicity, the reference level will be described as a single reference level R. As shown in waveform 36A, the reference level R intersects the envelope amplitude, for example, at points $X_1$ and $X_2$. The output of the comparator 38 is inverted relative to the state of its input signal. The output can also be seen as a bi-level, or a "binary", signal that varies, as shown by waveform 38A, from a high voltage level (e.g., 5 volts) to a low voltage level (e.g., 0 volts).

The output signal from the comparator 38 is provided to the aforementioned processor 28, which provides the instructions for controlling the stepping motor 26. Resident in the processor 28 is a sampling program for sampling the output signal from the comparator 38 at particular times defined by a sample clock 44. A plurality of samples of the signal waveform 38A, for example, 100 samples, is taken for each position 1-16 of the stepping motor 26, as shown by FIG. 3. Each sample constitutes a high (+5 volts) or a low (0 volts) value of the waveform 38A and thus the presence of one value indicates the absence of the other value. In this way the waveform 38A can be seen to be "binary"; thus the frequency of occurrence of one level is a measure of signal strength.

The above-mentioned samples of the reproduced signal envelope are bi-level, or "binary", representations of signal strength at a series of spaced positions along a selected head trajectory. The reference level R is chosen so that values exceeding that level represent acceptable signal strength and, being that the comparator 38 inverts its output, the corresponding value provided to the processor 28 will be at the low (0) level for such strengths. Thus a measure of signal strength can be obtained by counting the occurrence of such low conditions among the sampled signals for a given head trajectory. The result is an integer value (i.e., 0 to 100) that profiles the signal quality of that trajectory. This procedure is then repeated seriatim for each increment (1-16) of the step motor 26. A set of integers are then stored in a profile storage 66 which maps the cross-track distribution of signal strength by transducer trajectory from the middle of the guard band on one side of a track to the middle of the guard band on the other side.

Figure 4:
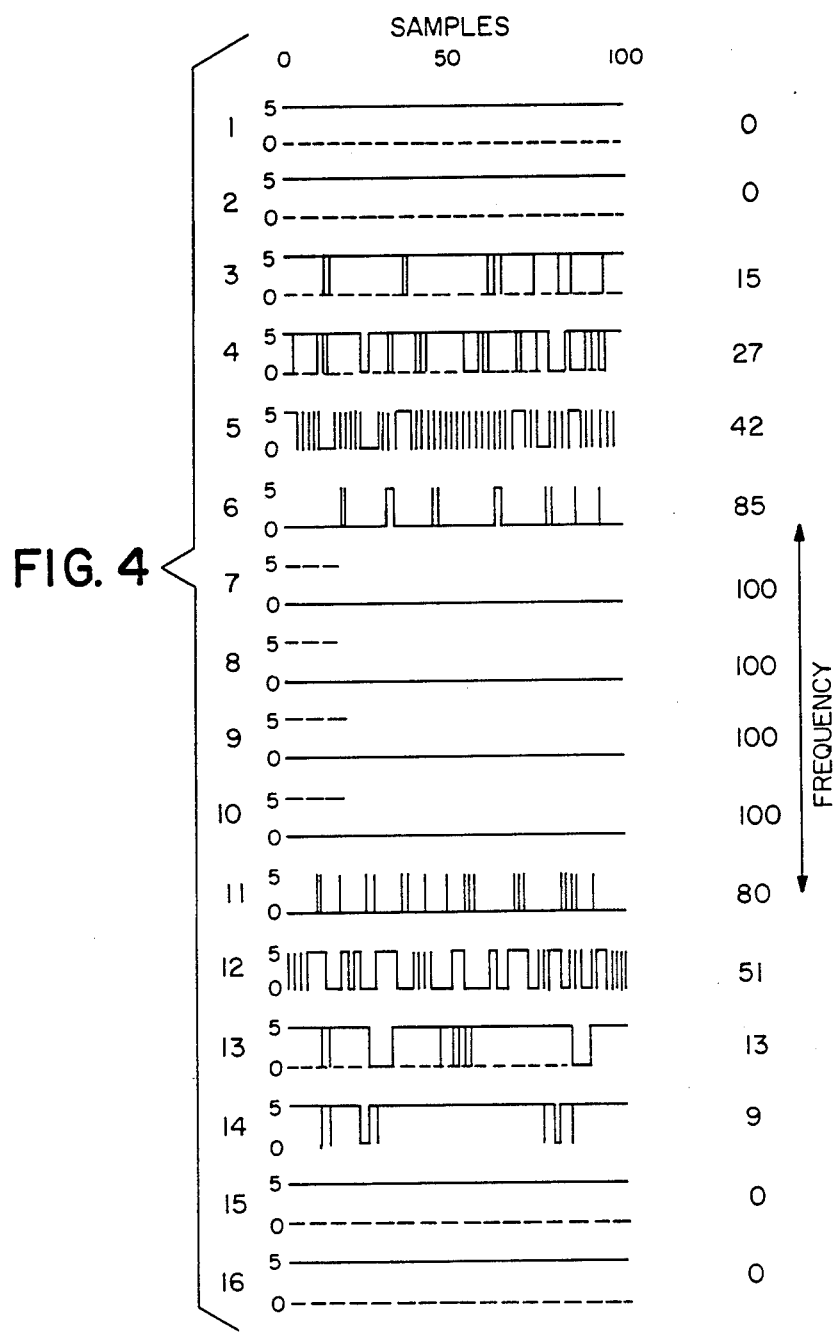
FIG. 4 is an exemplary rendering of the signal strength profile dveloped by a comparator as shown in FIG. 2 for each increment of the transducer.

An exemplary output of the comparator 38 for each increment of the step motor 26 is shown in FIG. 4 as 16 separate waveforms corresponding to each of the 16 steps shown by FIG. 3. Output waveforms vary from steps 1-2, where the reproduced signal envelope is always below the reference R and the output of the comparator 38 is therefore always high, through steps 7-10, where the envelope is always above the reference level R and the output always low, to steps 15-16, where the signal envelope is again always below the reference R and the output is again high. In between, the reproduced signal envelope is sometimes above and sometimes below the reference R and the respective comparator output is correspondingly low or high.

The particular step position 14 is singled out in FIG. 5 for closer inspection. The transitions in the early and later portions of the trajectory show that the higher signal strengths were found there, suggesting a certain amount of eccentricity in the trajectory relative to the recorded track. Samples are then taken over a period s encompassing all or a portion of a single trajectory or a single disk revolution (as also shown in FIG. 3). As shown by FIG. 5, one hundred discrete samples are taken during the course of this movement. By summing the occurrence of zero samples a measure, or profile, of acceptable signal strength can be obtained for each trajectory of the head (a value of 9 in the case of step 14).

Samples are also taken in the direction of the horizontal axes of the other 15 waveforms shown by FIG. 4. The occurrence of zero volt sample values is shown by the frequency tabulation to the right of the waveforms in FIG. 4. The frequency of zero volt samples as compared to five volt samples also reflects the "averaged" output of the comparator 38 over each transducer trajectory, as shown in particular by FIG. 6. Near the nominal midtrack points, that is from step position 1 to approximately 4 and from approximate step position 13 to 16, the "average" output reflects the lack of significant signal strength. Conversely, the predominance of zero levels therebetween shows the influence of high strength transitions. The inverted shape of the diagram as shown by FIG. 6 is the "averaged" outcome of this type of sampling. Another way of looking at FIG. 6 is that each position 1-16 of the horizontal axis of FIG. 6 can be seen from an orthogonal direction as an "average" of one of the sixteen waveforms presented by FIG. 4.

The comparator 38 is shown in greater detail in FIG. 7A. A special problem exists in applying a threshold because the reproduced signals from the outer tracks have a greater output level than the reproduced signals from the inner tracks. This happens because the tangential velocity of the transducer relative to a track increases with the radius of the track. The transducer output, which is a function of velocity, thus increases toward the edge of the magnetic disk. This effect is shown by FIG. 7B in which the amplitude envelope progressively decreases as the radius of the track decreases from the outermost track 1 to the innermost track 50.

The circuit of 7A provides a floating threshold that varies, except for the first track, according to the signal envelope of the previously reproduced track. A variable resistor 50 initially sets a threshold level that is lower than the least-expected track envelope (lower than that of track 50). A capacitor 52 and a resistor 54 comprise an RC circuit that charges to the peak level of the reproduced signal. This allows the capacitor 52 to collect charge for a new threshold reflecting the peak amplitude of the last track to be crossed. A diode 56 causes the charging voltage to the RC circuit to be dropped by 0.7 volt, thus assuring that the capacitor 52 charges to the existing peak envelope voltage less 0.7 volt. This allows "headroom" for a decision regarding signal strength. As shown by FIG. 7B, the reference level begins for the first track as provided by the variable resistor 50 at the level 58-1 (in broken line), thereafter charging to the level 58-2 (in broken line) for the second track, the level 58-3 for the third track and so on until the final reference level 58-50 is reached for the fiftieth track. A speed-up circuit consisting of the resistor 62 and a capacitor 60 is connected across the feedback resistor 40 to enhance the switching speed.

Referring back to FIG. 2, the processor 28 is programmed to characterize the profile of a given trajectory as herein described and then to choose the best position, i.e. motor step, at which to place the transducer 20 for a maximum playback signal. For example, in connection with the trajectories illustrated by the frequency distribution in FIG. 4, any of the motor steps 7-10 could be chosen. in practice, either step 8 or 9 would be chosen so as to approximately center the transducer with respect to the part of the medium producing a good signal. The program applies a set of acceptance criteria 64 in order to make the proper decision.

Figure 8A:
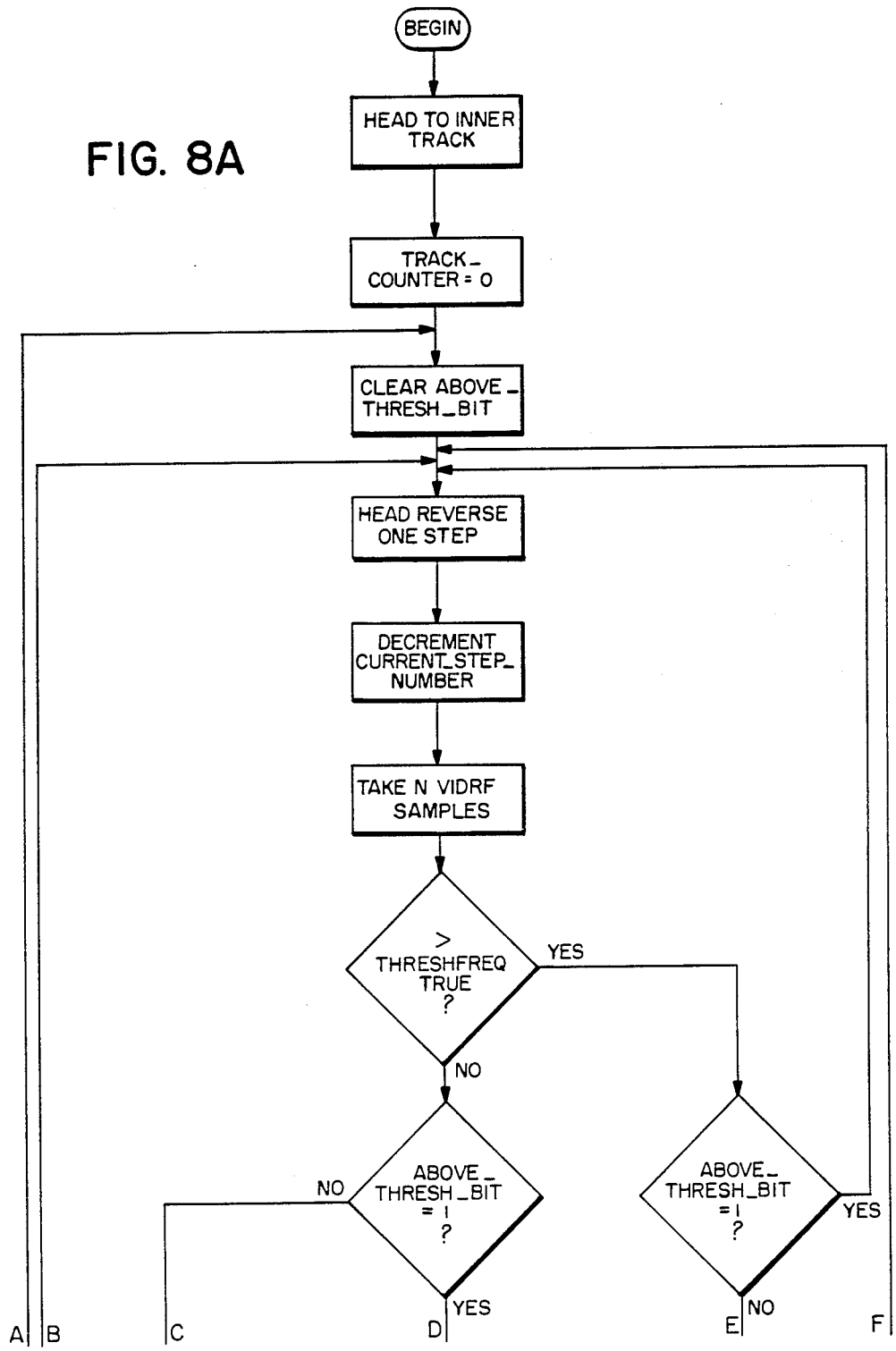
FIGS. 8A and 8B show a flow chart illustrating an exemplary method for mapping an entire disk for track locations according to the invention.
Figure 8B:
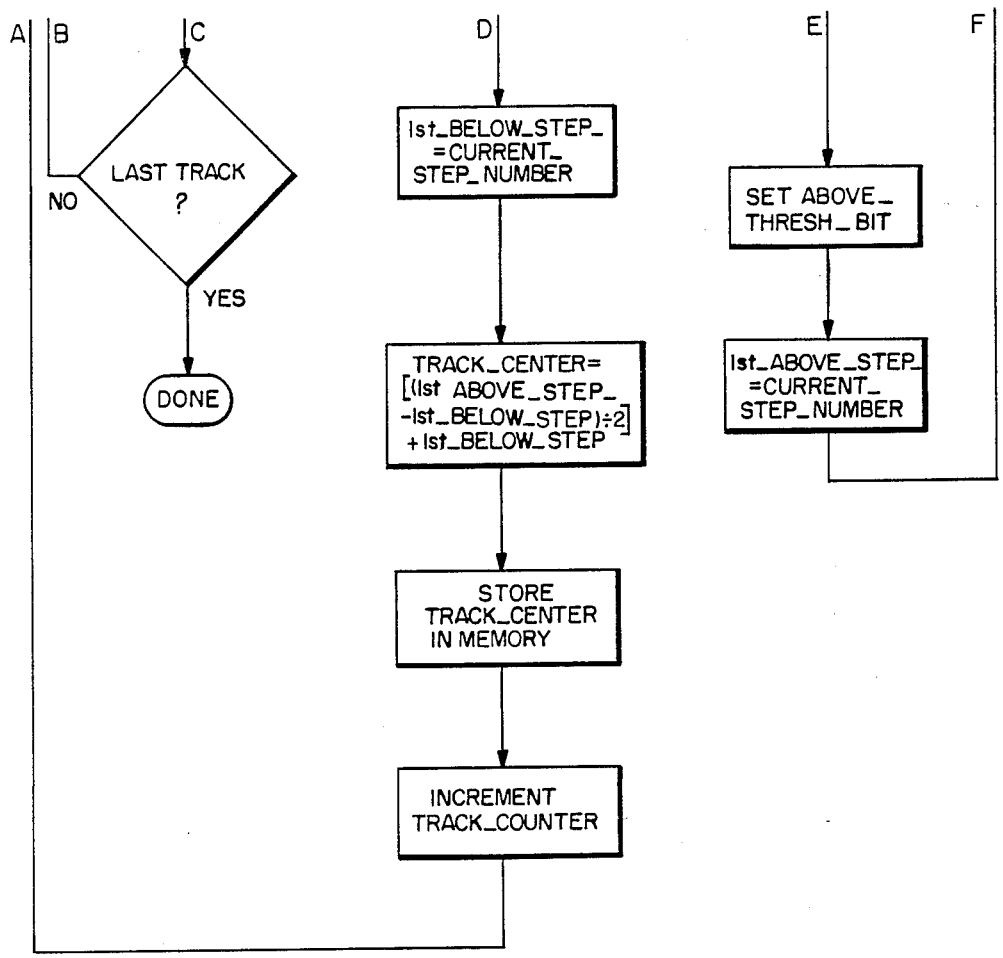

These criteria are incorporated in the design of a program such as shown by the flowchart of FIGS. 8A and 8B. Besides showing a typical decision process based on software thresholding for selecting the "best" transducer trajectory (i.e., one yielding an acceptable number of acceptable strength samples), FIGS. 8A and 8B illustrate the one-time profiling of the entire disk. Rather than mapping the area surrounding a single selected track when the disk is first put into the player, it is sometimes desirable to map the entire disk to find any trajectories that meet the acceptance criteria. FIG. 8A assumes the transducer (head) is first moved to the innermost track 50 and then incremented outward (by decrementing the "CURRENT_STEP NUMBER"). If the number N of samples (VIDRF) for a given trajectory is set to, e.g., 100 samples, then a threshold frequency (THRESHFREQ) of, e.g., 60 samples constitutes the acceptance criteria. A monitor bit (ABOVE_THRESH_BIT) is set when the first trajectory to exceed 60 samples above the amplitude threshold is found. The next trajectory to drop below 60 acceptable samples defines the "band" of trajectories that are acceptable; from these, the "best" trajectory (TRACK_CENT) is calculated and stored in the profile storage 66. This procedure is then repeated across the disk. The plurality of stored projectories then become a reference table in the storage 66 for immediately locating any track on the disk. This mapping procedure would be repeated every time a disk, even the same disk, is put into the player.

As heretofore explained, the invention provides an effective way to locate a transducer in the best position to reproduce a "wandering" track. By sampling the output of the comparator, rather than the reproduced signal itself, the apparatus according to the invention condenses a large amount of data into a manageable set of integers. These integers are used to generate a distribution of the signal strength across at least a portion of the medium in which a track can reasonably be expected to be found. This corresponds to a plurality of closely spaced head trajectories. From this distribution, that integer is selected that possesses the best "fit" to an ideal head trajectory overlying a prerecorded track.

The invention has been described in detail with particular reference to a presently preferred embodiment thereof, but it will be understood that variations and modifications can be effected within the spirit and scope of the invention.

What is claimed is:

1. Apparatus for finding an optimum location for a transducer relative to a prerecorded track on a rotary magnetic medium, said apparatus including means for rotating the medium at a predetermined velocity, and means for positioning the transducer in a plurality of positions relative to the prerecorded track so that the transducer traces a plurality of trajectories over the medium, said apparatus comprising:
    means responsive to the output of the transducer for generating an amplitude signal;
    means for comparing said amplitude signal to a predetermined reference level and generating an output signal that switches between two output levels depending on the relation of its input level to the reference level;
    sampling means for generating a plurality of samples from the output of said comparing means;
    means for accumulating the frequency of samples exceeding to the reference level for each of the plurality of trajectories; and
    means for selecting a particular trajectory according to a sampled frequency that corresponds to a particular amplitude level.

2. Apparatus as claimed in claim 1 in which said means for generating an amplitude signal comprises rectifying and filtering means for detecting an envelope of the recorded signal.

3. Apparatus as claimed in claim 1 in which said rotary magnetic medium comprises a magnetic disk having a plurality of prerecorded tracks having a nominal pitch therebetween and in which said trajectories are subdivisions of the track pitch.

4. Apparatus for locating a magnetic transducer relative to a selected one of a plurality of concentric magnentic tracks prerecorded on a magnetic disk, said apparatus including means for moving said transducer in a plurality of increments between adjacent tracks as the disk is rotating, means for comparing the signal strength of the recorded signal to a reference level for each transducer increment and for generating a bi-level output signal indicative of the signal level relative to the reference level, and control means for controlling said moving means to locate said transducer relative to the selected prerecorded track, the improvement wherein said control means comprises:
    means for generating a plurality of samples of the bi-level output of said comparing means for each transducer increment;
    means responsive to the samples for developing a cross-track distribution of the signal strength of the recorded signal for each of the incremental movements of said transducer; and
    means for effecting transducer positioning relative to an increment having an acceptable frequency of acceptable strength samples.

5. Apparatus as claimed in claim 4 in which said means for moving said transducer comprises a step motor, each step of said step motor corresponds to a particular trajectory of the transducer relative to the rotating disk, and wherein said means for developing a cross-track distribution generates said distribution relative to a plurality of said trajectories.

6. A method for finding an optimum location for a transducer relative to a prerecorded track on a rotating magnetic medium, said method comprising the steps of:
    moving the transducer through a plurality of small increments that subdivide the track pitch;
    comparing the strength of the recorded signal to a reference level, thereby generating a bi-level output signal;
    sampling the bi-level output signal at a plurality of spaced points along the trajectory traced by the transducer for each incremental movement;
    generating a sum corresponding to the frequency of samples for each trajectory that exceed an acceptable signal level;
    accumulating the sums from all of the trajectories traced by the transducer;
    selecting a trajectory that produced an acceptable sum; and
    moving the transducer to the increment corresponding to the selected trajectory.

7. A method as claimed in claim 6 in which the rotary magnetic medium constitutes a magnetic disk having a plurality of tracks prerecorded thereon, said step of moving the transducer comprises moving the transducer in a plurality of said small increments across all the tracks on the disk, and said step of selecting a trajectory comprises selecting a trajectory corresponding to a plurality of the tracks on the disk and storing the selected trajectories in a storage device for later access as needed to find an optimum transducer location arises.

* * * * *

UNITED STATES PATENT OFFICE
CERTIFICATE OF CORRECTION

PATENT NO. : 4,843,496
DATED : June 27, 1989
INVENTOR(S) : Jay D. Marchetti

It is certified that error appears in the above-identified patent and that said Letters Patent is hereby corrected as shown below:

Column 10, line 4, delete "needed" and insert ---the need---.

Signed and Sealed this

Fifteenth Day of May, 1990

*Attest:*

HARRY F. MANBECK, JR.

*Attesting Officer*  *Commissioner of Patents and Trademarks*